(12) United States Patent
Sato

(10) Patent No.: US 7,707,343 B2
(45) Date of Patent: Apr. 27, 2010

(54) INTERRUPT CONTROL CIRCUIT AND METHOD

(75) Inventor: Junichi Sato, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 126 days.

(21) Appl. No.: 11/790,805

(22) Filed: Apr. 27, 2007

(65) Prior Publication Data
US 2007/0255876 A1 Nov. 1, 2007

(30) Foreign Application Priority Data
Apr. 28, 2006 (JP) .............................. 2006-125247

(51) Int. Cl.
*G06F 13/24* (2006.01)
(52) U.S. Cl. .................................................... 710/262
(58) Field of Classification Search .......... 710/260–269
See application file for complete search history.

(56) References Cited

U.S. PATENT DOCUMENTS

| | | | | |
|---|---|---|---|---|
| 3,984,820 | A * | 10/1976 | Stanley et al. ................ | 710/265 |
| 3,999,165 | A * | 12/1976 | Kita et al. ..................... | 710/264 |
| 4,213,201 | A * | 7/1980 | Gagnier et al. ............... | 370/220 |
| 4,768,149 | A * | 8/1988 | Konopik et al. ............... | 710/47 |
| 5,101,497 | A * | 3/1992 | Culley et al. ................. | 710/261 |
| 5,179,704 | A * | 1/1993 | Jibbe et al. .................... | 710/262 |
| 5,438,677 | A * | 8/1995 | Adams et al. ................ | 710/263 |
| 5,471,620 | A * | 11/1995 | Shimizu et al. .............. | 710/265 |
| 5,560,019 | A * | 9/1996 | Narad .......................... | 710/260 |
| 5,659,759 | A * | 8/1997 | Yamada ....................... | 710/265 |
| 5,751,638 | A * | 5/1998 | Mick et al. ............. | 365/189.04 |
| 5,768,599 | A * | 6/1998 | Yokomizo .................... | 710/260 |
| 5,857,108 | A * | 1/1999 | Hong .......................... | 710/260 |
| 5,918,057 | A * | 6/1999 | Chou et al. ................... | 710/260 |
| 6,148,361 | A * | 11/2000 | Carpenter et al. ........... | 710/260 |
| 6,163,829 | A * | 12/2000 | Greim et al. ................. | 710/260 |
| 6,542,921 | B1 * | 4/2003 | Sager .......................... | 718/108 |
| 6,792,492 | B1 * | 9/2004 | Griffin ......................... | 710/262 |
| 7,080,179 | B1 * | 7/2006 | He et al. ...................... | 710/269 |

FOREIGN PATENT DOCUMENTS

JP 2005-284760 10/2005

* cited by examiner

*Primary Examiner*—Paul R Myers
(74) *Attorney, Agent, or Firm*—McGinn IP Law Group, PLLC

(57) ABSTRACT

According to an embodiment of the present invention, an interrupt control circuit that controls a plurality of interrupt requests for interrupt handling executed by a processor, includes: an interrupt control module unit as a detecting unit determining whether or not there is an interrupt request masked with interrupt handling executed by a processor during the interrupt handling; and an interrupt control circuit including a priority mask flag indicating whether or not there is the interrupt request. With such configuration, it is possible to simply determine whether or not there is another masked interrupt request.

17 Claims, 16 Drawing Sheets

| BIT NO. | 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- | --- |
| BIT NAME | PMR 15 | PMR 14 | PMR 13 | PMR 12 | PMR 11 | PMR 10 | PMR 9 | PMR 8 | PMR 7 | PMR 6 | PMR 5 | PMR 4 | PMR 3 | PMR 2 | PMR 1 | PMR 0 |
| BIT VALUE | 0 | 0 | 0 | 0 | 0 | 0 | 0 | 0 | 0 | 0 | 0 | 0 | 0 | 0 | 0 | 0 |

INITIAL VALUE 0 x 0000

Fig. 3

| ICSR | | | | | | | | | | | | | | | | |
|---|---|---|---|---|---|---|---|---|---|---|---|---|---|---|---|---|
| BIT NO. | 0 | 1 | 2 | 3 | 4 | 5 | 6 | 7 | 8 | 9 | 10 | 11 | 12 | 13 | 14 | 15 |
| BIT NAME | A | B | C | 0 | A | B | C | 0 | PMF | 0 | 0 | 0 | 0 | 0 | 0 | 0 |

Fig. 5

PMRR

| BIT NO. | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| BIT NAME | PMF 15 | PMF 14 | PMF 13 | PMF 12 | PMF 11 | PMF 10 | PMF 9 | PMF 8 | PMF 7 | PMF 6 | PMF 5 | PMF 4 | PMF 3 | PMF 2 | PMF 1 | PMF 0 |

Fig. 8

INTERRUPT CONTROL CIRCUIT AND METHOD

BACKGROUND OF THE INVENTION

1. Field of the Invention

The present invention relates to an interrupt control circuit, and more particularly to interrupt control circuit and method for providing information necessary for handling plural interrupt requests with a processor.

2. Description of Related Art

In recent years, application-specific embedded systems have been widely used in the fields of household electrical appliance and automobile and various other fields. In the embedded systems, a processor should control more and more units, which leads to an increase in the number of interrupt signals to be processed with the processor. For example, if the processor needs to control an electronic control unit, data backup as well as system control should be carried out in some cases. In such cases, the processor receives an interrupt request for the system control and an interrupt request for the data backup.

Interrupt handling for the system control cannot keep pace with state changes of the electronic control unit unless being completed during a predetermined period. As a result, a failure would occur upon the system control. Hence, a real-time response is required of the processor to surely complete interrupt handling for the system control during a predetermined period from when an interrupt occurred and send back the processing result. On the other hand, as for interrupt handling for the data backup, no particular problem occurs even if a period from the interrupt occurrence to the completion of handling varies from time to time. Hence, the processor does not need to have so high response.

An allowable processing time of the processor varies depending on operational conditions of the electronic control unit. For example, if an operation speed of the electronic control unit is high, the processing time is short. If the speed is low, the time is long. If the allowable processing time of the processor is short or the number of actions to be processed increases, high throughput is required of the processor. Hence, if the processor can accept all interrupt handling requests, and an excessive number of interrupts occur, it is impossible to handle all the interrupts in some cases. To that end, the processor is provided with an interrupt control circuit for controlling interrupt handling in such a manner that an interrupt to be handled in non-real time is temporarily masked and held, and an interrupt to be handled in real time is processed if the throughput of the processor is not so high.

Japanese Unexamined Patent Application Publication No. 2005-284760 discloses a conventional interrupt control circuit example. Japanese Unexamined Patent Application Publication No. 2005-284760 describes a method of grouping plural interrupt requests and setting a mask on a group basis. According to this method, a predetermined interrupt request out of the plural interrupt requests can be easily masked.

However, the inventors of the subject application have found that the related art faces the following problems. In the related art, there is a possibility that a higher-priority interrupt request is masked while the processor excutes interrupt handling. The processor checks each register storing interrupt requests and determines whether or not any masked interrupt request remains. If the number of registers to be checked by the processor is small, no particular problem arises. However, if the processor should check as many registers as several tens to several hundreds of registers, it takes lots of time to check all the registers.

SUMMARY OF THE INVENTION

According to a first aspect of the present invention, an interrupt control circuit that controls a plurality of interrupt requests for interrupt handling executed by a processor, includes: a detecting unit determining whether or not there is an interrupt request masked with interrupt handling executed by a processor during the interrupt handling; and a priority mask flag indicating whether or not there is the interrupt request. With such configuration, it is possible to determine whether or not there is a masked interrupt request.

Further, according to a second aspect of the invention, an interrupt control method that controls a plurality of interrupt requests for interrupt handling executed by a processor, includes: executing the interrupt handling; determining whether or not there is an interrupt request masked with the interrupt handling during the interrupt handling; and storing a flag indicating whether or not there is the interrupt request. According to the method, a resource can be efficiently used.

As described above, it is possible to provide an interrupt control circuit capable of efficiently determining whether or not there is another masked interrupt request if a processor handles plural interrupt requests.

BRIEF DESCRIPTION OF THE DRAWINGS

The above and other objects, advantages and features of the present invention will be more apparent from the following description taken in conjunction with the accompanying drawings, in which:

FIG. 3 is an explanatory view of a configuration example of a PMR of the first embodiment;

FIG. 5 shows the specifications of an interrupt control register of the first embodiment;

FIG. 8 is an explanatory view of a configuration example of a PMRR of the first embodiment.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, preferred embodiments of the present invention will be described. For ease of illustration, components of the following description and accompanying drawings are omitted or simplified, and repetitive description is omitted if not necessary.

First Embodiment

Figure 1:
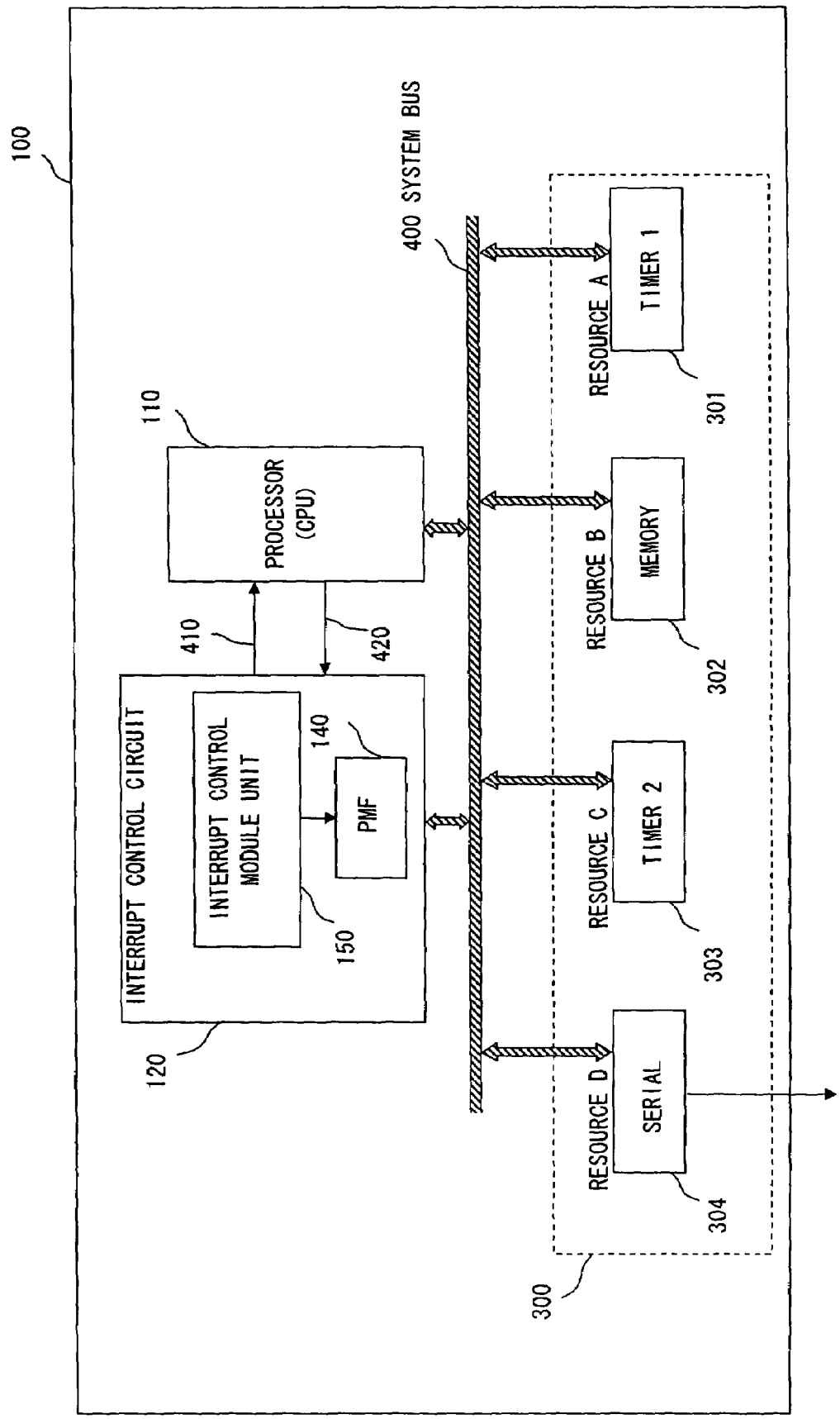
FIG. 1 is a block diagram of the configuration of a semiconductor device according to a first embodiment of the present invention.

Referring to the accompanying drawings, a first embodiment of the present invention is described first. The first embodiment is accomplished as a single-chip circuit obtained by packaging an interrupt control circuit of the present invention into a semiconductor element such as an LSI (Large Scale Integrated Circuit). FIG. 1 is a block diagram of a semiconductor device including the interrupt control circuit of the first embodiment. As shown in FIG. 1, a semiconductor device 100 includes a processor 110, an interrupt control circuit 120, and resource 300. The semiconductor device 100 further includes a system bus 400 for connecting these components to exchange commands and data, signal lines 410 and 420 for directly connecting between the interrupt control circuit 120 and the processor 110, and a power supply line and input/output terminal for operating these. Incidentally, the power supply line or input/output terminal is omitted from the drawings.

The first embodiment illustrates the semiconductor device 100 used in an embedded system for controlling, for example, an electronic control unit. In this case, the processor (CPU: Central Processing Unit) 110 executes system control for the electronic control unit, and interrupt handling such as data processing based on sensor information, system self-diagnosis, and data backup. The interrupt control circuit 120 controls an interrupt request sent to the processor 110. Resources 300 are functions necessary for interrupt handling, for example, a timer, a memory, or a serial communication mechanism.

Each resource is connected to the system bus 400 as needed, and transmits/receives data or commands via the system bus 400 to/from the processor 110, the interrupt control circuit 120, or the other resources 300. Further, each resource is provided with an input/output terminal if necessary. Needless to say, data or the like can be transmitted/received between predetermined circuits not through the system bus 400 as needed. The circuits are not shown for ease of illustration. To facilitate understanding of the resources, for example, the resource 300 includes a resource A301, a resource B302, a resource C303, and a resource D304. More specifically, the resource A301 is a timer 1, the resource B302 is a memory, the resource C303 is a timer 2, and the resource D304 is a serial communication mechanism (hereinafter referred to as "serial"). Incidentally, the function or number of resources can be, of course, changed in accordance with applications of the semiconductor device 100. Incidentally, the above semiconductor device 100 is also called "microcontroller" and broadly interpreted as "microcomputer".

Further, the interrupt control circuit 120 includes an interrupt control module unit 150 as a detecting unit for determining whether or not any masked interrupt request remains during interrupt handling, and a priority mask flag 140 (hereinafter referred to as "PMF") which indicates whether or not there is an interrupt request. The configuration and operation thereof are described later. As has been described above, a feature of a first aspect of the present invention resides in the interrupt control circuit 120 provided with the interrupt control module unit 150 and the PMF 140. A flag state of the PMF 140, that is, data about the PMF 140 is readable from the processor 110 via the system bus 400. Detailed description thereof is given later. Incidentally, the data about the PMF 140 is readable via a special bus for reading information about the PMF 140 from the processor 110, not via the system bus 400.

Figure 2:
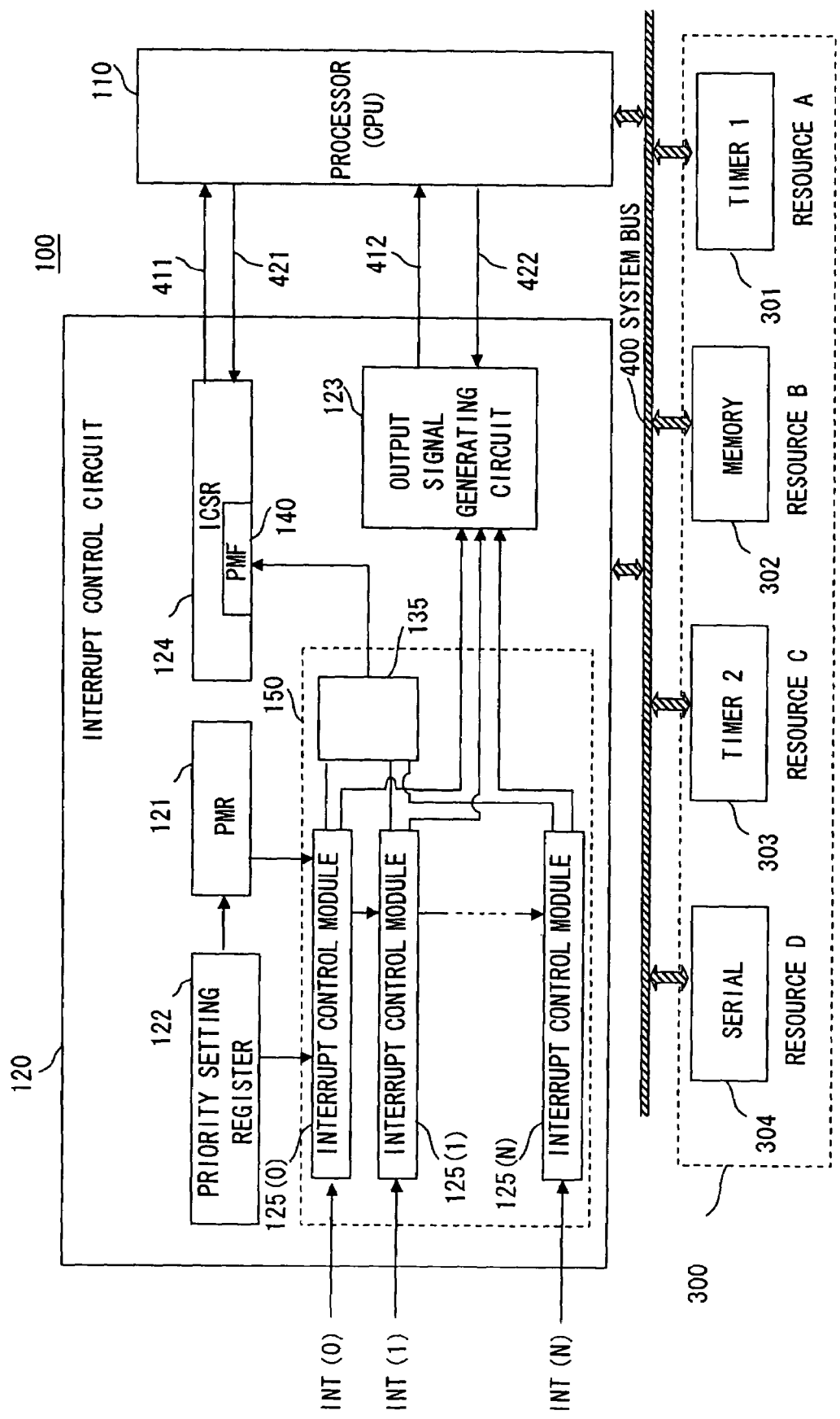
FIG. 2 is a block diagram of the configuration of an interrupt control circuit of the semiconductor device of the first embodiment.

FIG. 2 is a detailed diagram of the interrupt control circuit 120 in the semiconductor device 100. The interrupt control circuit 120 includes a priority mask register (hereinafter referred to as "PMR") 121, a priority setting register 122, an output signal generating circuit 123, an interrupt control register 124 including the PMF 140, and an interrupt control module unit 150 including plural interrupt control modules 125(0) to 125 (N) (N: natural number) and a first output circuit 135 for processing a first output of the module group and outputting the processing result to the PMF 140. If the special bus for reading information about the PMF 140 from the processor 110 is provided, signal lines 411 and 421 are provided. Incidentally, the interrupt control module unit 150 is detailed below.

In the interrupt control circuit 120, plural interrupt request signals INT(0) to INT(N) are input to each of the interrupt control modules 125(0) to 125(N) in the interrupt control module unit 150. The interrupt request signals INT(0) to INT (N) are not only generated in the semiconductor device 100 but also sent from the outside of the semiconductor device 100. To select a signal to be processed with the processor 110 from among the request signals, the priority setting register 122 sets a priority level for each interrupt request. Then, the PMR 121 determines which interrupt request on which priority level is masked. As a result, the output signal generating circuit 123 selects the highest-priority one from the interrupt requests not masked with the PMR 121, and outputs an interrupt request signal and interrupt identifying signal corresponding to the selected one to the processor 110. On the other hand, the interrupt control register 124 determines whether or not any interrupt request is masked with the PMR 121 in accordance with a request from the processor 110 and outputs the determination result to the processor 110.

The plural interrupt control modules 125(0) to 125(N) correspond to the interrupt request signals INT(0) to INT(N). The interrupt control modules 125(0) to 125(N) hold the input interrupt request signals INT(0) to INT(N) until the processor 110 accepts the interrupt request signals INT(0) to INT(N). Then, it is determined whether or not to transmit the request signal to the output signal generating circuit 123 in accordance with a priority of the interrupt request.

The priority setting register 122 stores priorities assigned to the interrupt request signals INT(0) to INT(N) input to the plural interrupt control modules 125(0) to 125(N). The priority level can be set based on, for example, a real-time responsiveness necessary for handling an interrupt request.

FIG. 3 is an explanatory view of the PMR 121. The PMR 121 holds information about whether or not to mask interrupt requests on a priority level set by the priority setting register 122. The PMR 121 is a register having bits of the number corresponding to an interrupt priority level. In the PMR 121, bit number and name are set for each bit in association with the interrupt priority level. For example, if a flag 1 is set the flag indicates that a masking target is a bit number of a specific priority (for example, priority 9), an interrupt request of the priority 9 is masked. Such information that an interrupt handling request of an interrupt priority corresponding to each bit is masked ("H") or not masked ("L") is set to each bit. In the illustrated example of FIG. 3, 16 priority levels are set, so the PMR 121 stores 16-bit data. The information to the effect that the interrupt handling is masked ("H") corresponds to "1", and the information to the effect that the interrupt handling is not masked ("L") corresponds to "0". These information are written to bits. An initial value is 0, and FIG. 3 shows an initial state. As described above, the number of resistor bits corresponds to the number of interrupt priority levels.

Figure 4:
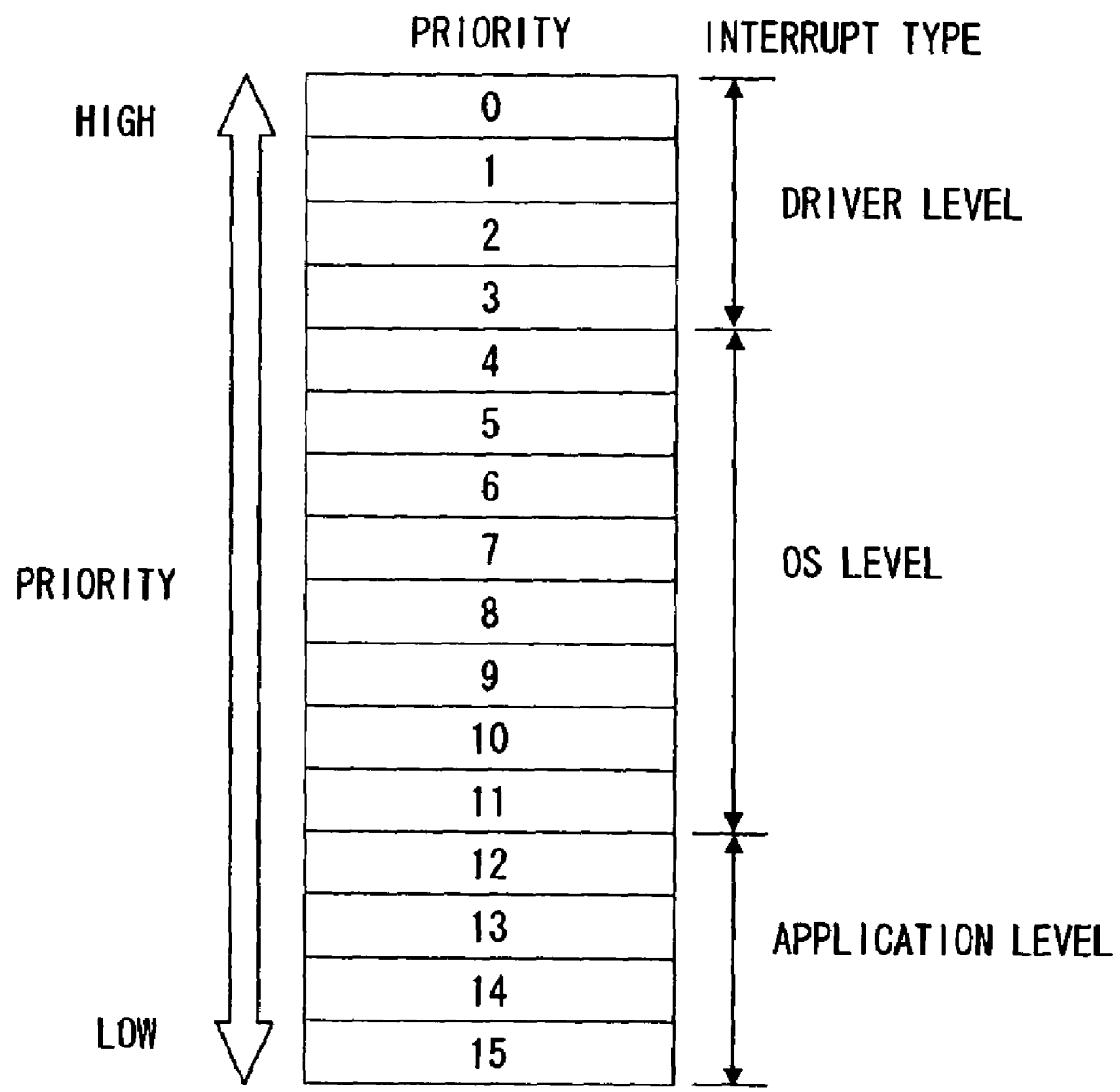
FIG. 4 shows an example of assigning interrupt priorities to the PMRs of the first embodiment.

FIG. 4 shows interrupt request groups and priority levels necessary for the system, based on the PMR 121. For example, in the case of masking interrupt requests grouped into an OS level and an application level, all interrupt requests of an interrupt priority 4 to priority 15 are masked. Thus, "H", that is, "1" is written to the $4^{th}$ to $15^{th}$ bits of the PMR 121 as shown in FIG. 3, and "L", that is, "0" is written to the other bits (that is, $0^{th}$ to $3^{rd}$ bits). Data in the PMR 121 is rewritable in accordance with a processing status of the processor 110. Hence, an interrupt request to mask can be changed as needed.

If receiving a signal to the effect that a corresponding interrupt request is sent from the interrupt control modules 125(0) to 125(N), the output signal generating circuit 123 selects the highest-priority interrupt request. The output signal generating circuit 123 outputs an interrupt request signal and interrupt identifying signal corresponding to the interrupt request to the processor 110. The processor 110 accepts any interrupt request and then starts handling an interrupt corresponding to the request.

Referring to FIG. 5, the interrupt control register 124 is described below. FIG. 5 shows an example of the interrupt control register of the first embodiment, which is referred to as "ICSR" (Interrupt Control Status Register). The register stores, for example, 16-bit data. In FIG. 5, functions are assigned to bits 0, 1, 2, 4, 5, 6, and 8. The priority mask flag (PMF) 140 is assigned to the register bit 8. The PMF 140 monitors the other interrupt requests masked with the PMR 121 and stores the monitor result. The PMF 140 functions to indicate whether or not there is an interrupt request masked in accordance with an interrupt priority in the interrupt control modules 125(0) to 125(N). The processor 110 reads data about the PMF 140. If the PMF 140 is set to "H", the processor 110 determines that there is an interrupt request masked with the PMR 121. If the PMF 140 is set to "L", the processor 110 determines that there is no corresponding interrupt request. Incidentally, in FIG. 5, no function is assigned to the bit that is given the bit name "0". Further, functions assigned to the bit names A, B, and C other than PMF are not related to the present invention, so description thereof is omitted here.

Figure 6:
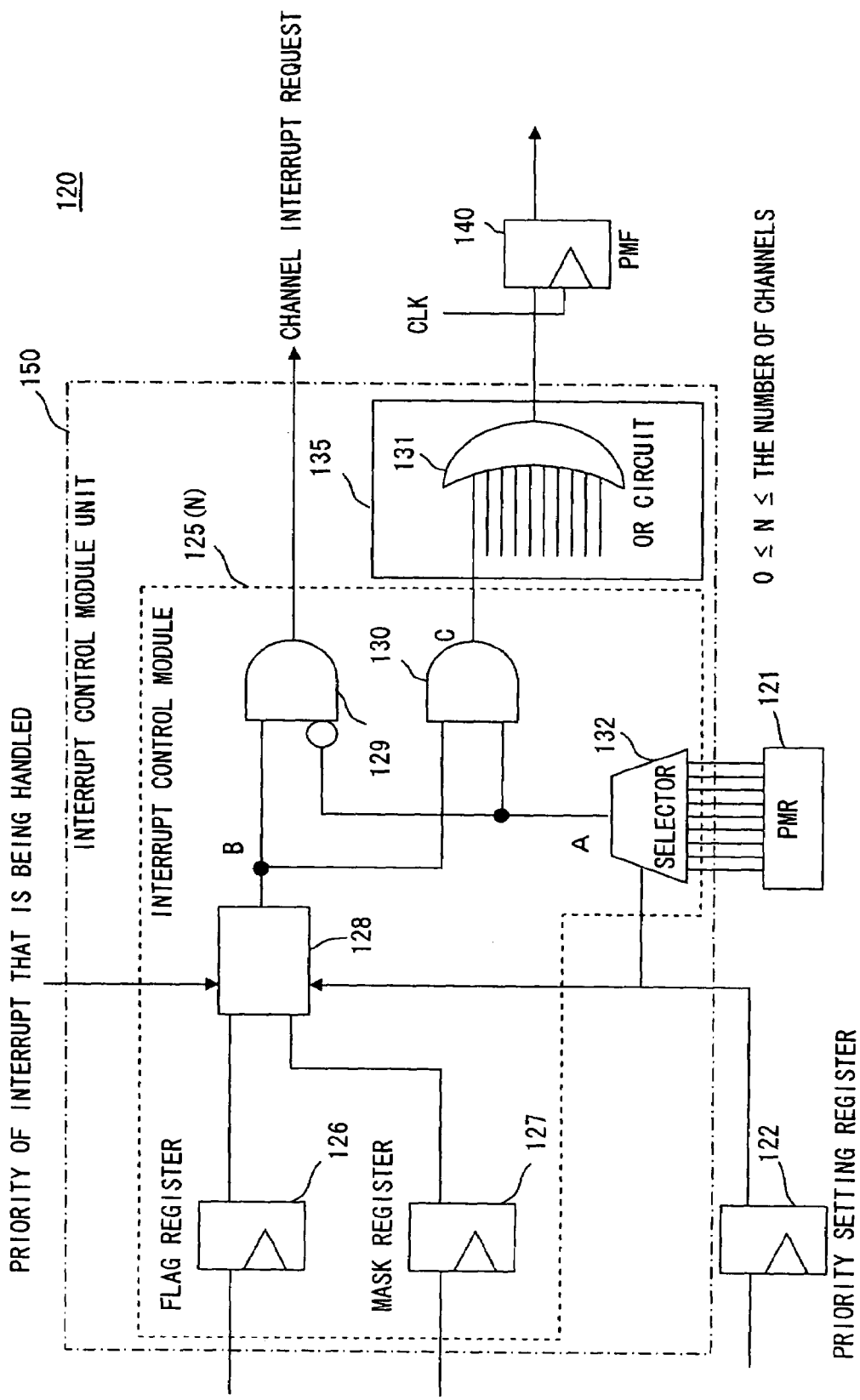
FIG. 6 is a circuit diagram showing an example of PMF implementation of the first embodiment.

Referring to FIG. 6, description is made of an example of a method of storing data as to whether or not there is an interrupt request masked with the PMR 121, in the PMF 140. FIG. 6 is a detailed diagram of the configuration of the interrupt control modules 125(0) to 125(N) of the interrupt control circuit 120 as shown in FIG. 2. The plural interrupt control modules 125(0) to 125(N) include a flag register 126, a mask register 127, three the logic circuits 128, 129, and 130, and a selector 132. Further, the interrupt control module unit 150 is composed of the plural interrupt control modules 125(0) to 125(N), and an OR circuit 131. Incidentally, the OR circuit 131 is a specific example of the first output circuit 135 for processing the first output and sending the processing result to the PMF 140 as shown in FIG. 2.

The flag register 126 holds an input interrupt request until the processor 110 accepts the interrupt request. The mask register 127 has a function of masking each interrupt request.

If the mask register 127 is set to "H", an interrupt signal held in the flag register 126 is masked. That is, no signal is output from the logic circuit 128. In other words, an output of the logic circuit 128 is set to "L".

Further, the logic circuit 128 receives information about a priority of interrupt request currently handled with the CPU 110, and priority information in the priority setting register 122. If a priority of interrupt request currently handled with the CPU 110 is equal to or higher than a priority set in the priority setting register 122, the logic circuit 128 outputs a signal B of "L" even through the flag register 126 is set to "H" and the mask register 127 is set to "L" (not to mask). That is, no signal is output. Therefore, if the flag register 126 receives the interrupt request, and the signal of "H" is output from the flag register 126, the logic circuit 128 outputs the signal B of "H" on the assumption that the interrupt request input to the flag register 126 is not masked with the mask register 127, and a priority of interrupt request currently handled with the CPU 110 is lower than a priority set in the priority setting register 122.

On the other hand, it is determined whether or not to mask an interrupt request with the PMR 121 based on an interrupt priority set by the priority setting register 122. Thus, a signal A indicating whether or not to mask the request with the PMR 121 is read from the PMR 121 and output through the selector 132. That is, if the request is masked with the PMR 121, the signal A is set to "H"; otherwise, the signal A is set to "L".

Here, if the signal B is set to "H" (not masked with the logic circuit 128) and the signal A is set to "L" (not masked with the PMR 121), an interrupt request is not masked. Thus, the logic circuit 129 outputs a signal of "H". After compared with the other interrupt requests and controlled, the interrupt request is sent from the output signal generating circuit 123 of FIG. 2 to the processor 110. Incidentally, detailed description of the comparison is given below. If the signal B is set to "H" (not masked with the logic circuit 128) and the signal A is set to "H" (masked with the PMR 121), the interrupt request is masked. Hence, the logic circuit 129 outputs a signal of "L", and no interrupt request is output. At the same time, the signal C of the logic circuit 130 is set to "H". The signal C indicates whether or not there is an interrupt request masked with the PMR 121 in the interrupt control modules 125(0) to 125(N). The signal C of "H" represents that an interrupt request masked with the PMR 121 is detected, and the signal C of "L" represents that an interrupt request masked with the PMR 121 is not detected. All of the signals C output from the interrupt control modules 125(0) to 125(N) are collected at the OR circuit 131 to determine whether or not there is an interrupt request masked with the PMR 121.

That is, the interrupt control module unit 150 is composed of the plural interrupt control modules 125(0) to 125(N) and the first output circuit 135 (the OR circuit 131 is a specific example of the first output circuit 135), and the interrupt control module unit 150 functions as a detecting unit for detecting an interrupt request. The detection result of the detecting unit is stored in the PMF 140. The flag indicating whether or not an interrupt request is masked can be read from the processor 110 via the system bus 400. Incidentally, the configuration of the interrupt control modules 125(0) to 125(N) or the interrupt control module unit 150 of FIG. 6 is a configuration example of the first embodiment. Hence, the other circuit configuration can be employed insofar as the circuit has similar functions. For example, it is possible to additionally provide a unit having the function for masking an interrupt request of lower priority than that of a currently handled interrupt request, which is given to the logic circuit 128 in the above description, between the output stage of the logic circuit 128 and the input stage of the logic circuit 129.

Further, in this embodiment, channel interrupt requests from the logic circuit 129 are sent to the output signal generating circuit 123. A circuit for combining these output requests and selecting one channel interrupt request from the requests, that is, executing comparison and control may be provided in the interrupt control module unit 150. Further, this circuit may be used as a second output circuit to constitute a control circuit behind the plural interrupt control modules 125(N) together with the above first output circuit 135.

As described above, it is determined whether or not to mask a request based on information about a priority of an interrupt being handled with the CPU 110, the priority setting register 122, and the PMR 121. Based on the determination result, it is possible to determine whether or not there is a masked interrupt request while masking the interrupt request.

Figure 7:
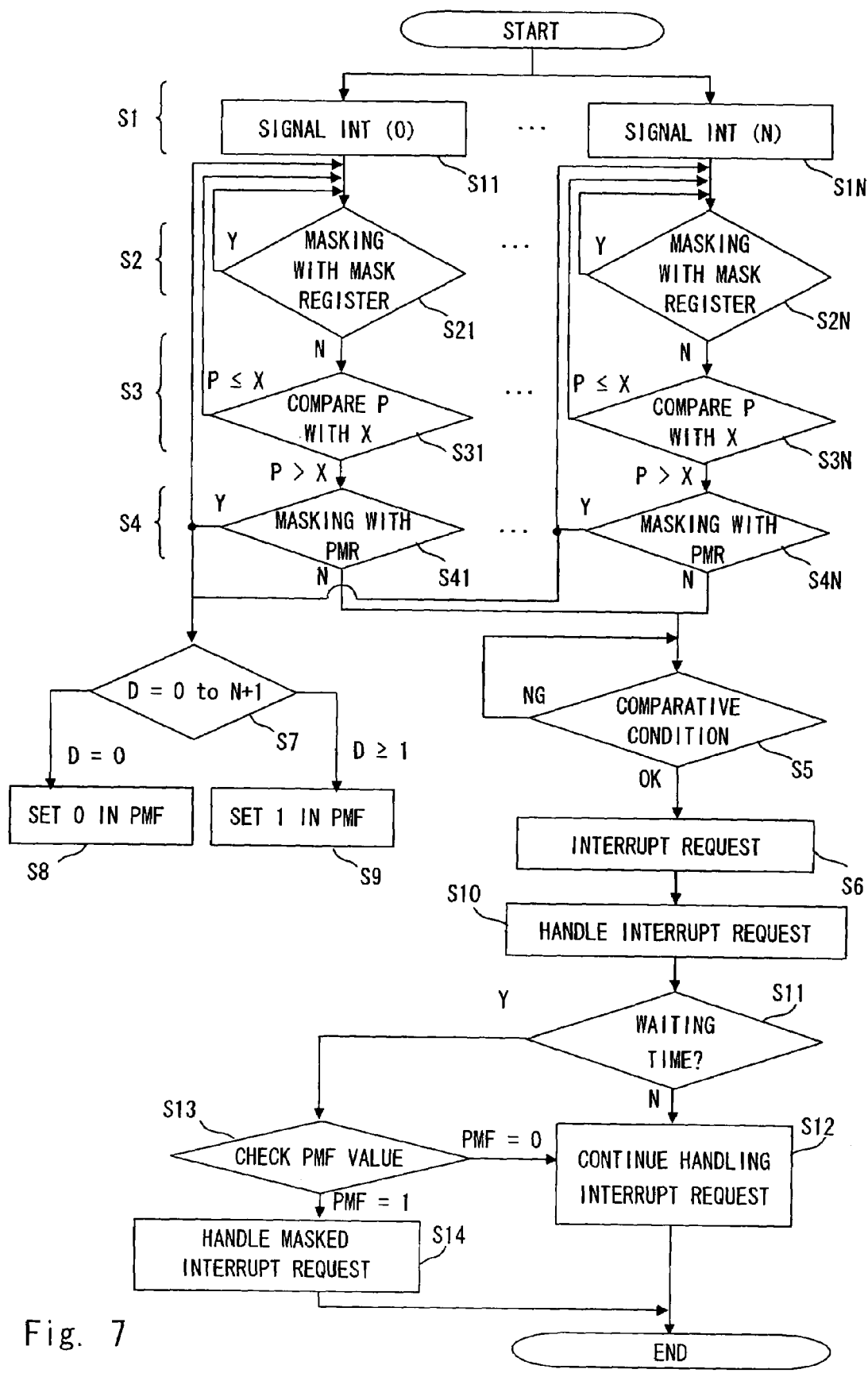
FIG. 7 is a flowchart of a processing operation of an interrupt control method of the first embodiment.

Referring next to FIG. 7, an operation of handling an interrupt request based on whether or not there is an interrupt request to be masked with the PMR 121 is described. FIG. 7 is a flowchart of processing of sending an interrupt request to the interrupt control circuit 120, storing information as to whether or not there is an interrupt request masked with the PMR 121 in the PMF 140, and executing interrupt handling based on the information. Incidentally, the following description is made also with reference to the specific circuit configuration of FIG. 6 as needed.

To begin with, in S1, the plural interrupt request signals INT(0) to INT(N) are input. The number of input interrupt signals is 0 to (N+1). FIG. 7 is a flowchart of processing of the plural interrupt request signals INT(0) to INT(N). FIG. 7 focuses on the interrupt request signals INT (0) and INT (N). In S2, it is individually determined whether the input interrupt request signals INT(0) to INT(N) are masked with the mask register 127 of FIG. 6 (S21, S2N). If masked with the mask register 127, the interrupt request is held in the flag register 126 of FIG. 6 as it is. If not masked with the mask register 127, a priority (P) of an interrupt request currently handled with the CPU 110 is compared with a priority (X) set in the priority setting register 122 in S3 (S31, S3N). Here, P and X represent a numerical value of a priority (natural number), and a smaller value corresponds to a higher priority. Hence, if the priority of the currently handled interrupt request is low, that is, P>X, the control advances to S4. If the priority of the interrupt request currently handled with the CPU 110 is equal to or higher than priority (X), that is, P≦X, the control returns to S1 of FIG. 7. After the completion of processing in S2 and S3, the control advances to S4. In S4, it is individually determined whether the requests are masked with the PMR 121 of FIG. 6 (S41, S4N).

If the interrupt request signals INT(0) to INT(N) are not masked with the PMR 121, as shown in FIG. 6, a channel interrupt request is output from the corresponding interrupt control module 125(N) to the output control circuit 123 (not shown). Incidentally, if channel interrupt requests are output from the plural interrupt control modules 125(0) to 125(N), the requests are compared with the other interrupt requests at the output control circuit of FIG. 2 (S5). Although not illustrated specifically, such comparison and control is executed by the output signal generating circuit 123 of FIG. 2 to select the highest-priority interrupt request. As a result, the selected interrupt request is output from the output signal generating circuit 123 to the processor 110 (S6). The remaining interrupt signals are not output, and comparison and control is executed again.

On the other hand, if the interrupt request signals INT(0) to INT(N) are masked with the PMR 121, the interrupt request signals INT(0) to INT(N) are not output. At the same time, information that the signals are masked with the PMR 121 are collected by the OR circuit 131 (S7). If the number of masked signals (D) is 0, the PMF 140 is set to "0" (S8). If the number of masked signals (D) is 1 to (N+1), the PMF 140 is set to "1" (S9).

Incidentally, the following point is stressed here. That is, if a priority of an interrupt request currently handled with the CPU 110 is lower than a priority preset with the priority setting register 122, it is determined whether or not the request is masked with the PMR 121. In other words, it is set by the PMF 140. Thus, if a priority of an interrupt request currently handled with the CPU 110 is equal to or higher than a priority preset with the priority setting register 122, it is determined whether or not the request is masked after interrupt request currently handled ends. If the request is masked, the PMF 140 is set to "1". In other words, an interrupt request the PMF 140 for which is set to "1" has relatively high priority. In other words, whether or not there is a higher-priority interrupt request can be easily determined with reference to the PMF 140. Further, in other words, the PMF 140 is a flag simply indicating whether or not an interrupt request of a priority equal to or higher than a priority of an interrupt request currently handled with the CPU 110. In practical use, whether or not there is an important interrupt request can be easily determined.

Next, when receiving the above the interrupt request (S6), the processor 110 starts handling an interrupt in S10. In S11, a timer or the like (not shown) is checked to determine whether or not waiting time is set during interrupt handling in S10. If no waiting time is set, interrupt handling of S10 is continued in S12. If the waiting time is set, data about the PMF 140 is read to determine whether or not there is an interrupt request masked with the PMR 121 (S13). Then, an interrupt request to be handled with the processor 110 is selected in accordance with a value of the PMF 140. If the PMF 140 is set to "0" (there is no masked interrupt request), interrupt handling is continued in S12. If the PMF 140 is set to "1" (there is a masked interrupt request), the masked interrupt request is handled (S14). If there are plural masked interrupt requests, the output signal generating circuit 123 selects the highest-priority interrupt request to handle the interrupt request.

As described above, the processor 110 can determine whether or not there is a masked interrupt request by reading the PMF 140. Accordingly, the processor 110 does not need to individually check registers holding interrupt requests, making it possible to reduce processing time for checking it.

Incidentally, as a first modified example of the first embodiment, it is possible to provide registers for collecting signals C output from the interrupt control modules 125(0) to 125(N) with respect to each interrupt priority, outside the PMF 140. FIG. 8 shows the register specifications of a PMRR (Priority Masked Request Register) as an example of the register for collecting signals C with respect to each priority level. As described above, the PMF 140 stores only information as to whether or not there is an interrupt request masked with the PMR 121 in the interrupt control modules 125(0) to 125(N). However, in the case of determining whether or not there is an interrupt request based on the priority level, the processor can determine whether or not there is an interrupt request masked with the PMR 121 with respect to each priority level by reading a register value of the PMRR corresponding to a priority level of the interrupt request. As a result, there are plural masked interrupt requests, it is possible to determine whether or not to handle a request based on the priority level instead of automatically handling a higher-priority request as described above. For example, even if the masked interrupt request is given a high priority, the request can be set not to handle as needed.

Figure 9:
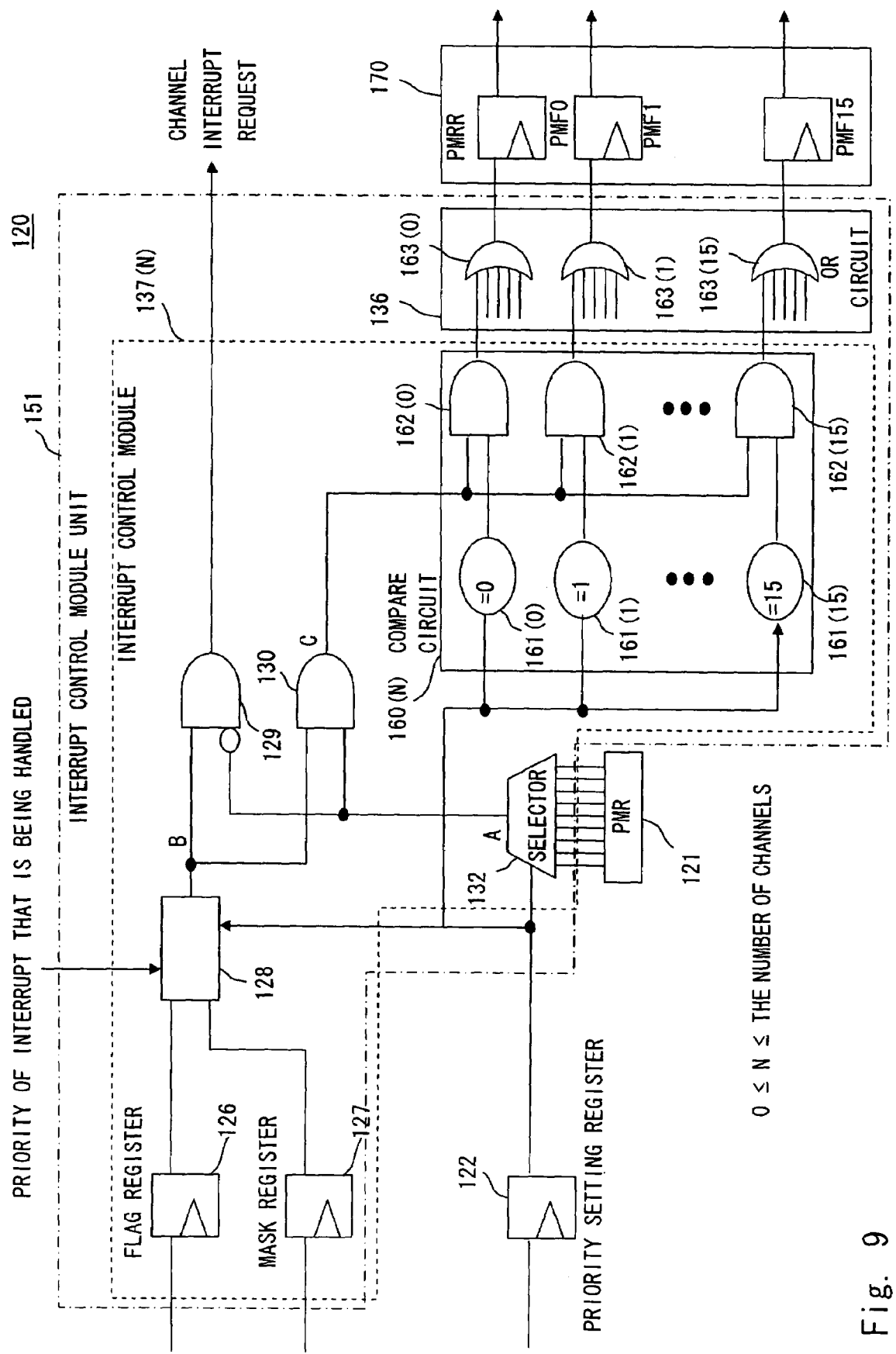
FIG. 9 is a block diagram of a first modified example of the first embodiment.

FIG. 9 shows the first modified example of the first embodiment. In the illustrated example of FIG. 9, in addition to the components of FIG. 6, compare circuits 160(0) to 160(N), an OR circuit 136, and a PMRR 170 are provided. The compare circuit 160(N) corresponds to the interrupt control module 137 (N). The compare circuit 160(N) is added to the interrupt control modules as compared with the interrupt control module 125(N) of the first embodiment as shown in FIG. 6. Detailed description thereof is given below. The other configuration and function are the same as those of the example of FIG. 6. Incidentally, surrounded by the alternate long and short dashed line is an interrupt control module unit 151. Here, the example of FIG. 9 differs from that of FIG. 6 in that plural OR circuits 136 are provided. The example of FIG. 9 is described below. The processing up to the output of the signal C is the same as that of FIG. 6, so its description is omitted here.

The compare circuit 160 (N) has a function of sorting interrupt requests on the priority level basis. The compare circuit 160 (N) includes comparators 161(0) to 161(15), and AND circuits 162(0) to 162(15). This modified example describes 16 priority levels, so 16 comparators and 16 AND circuits are provided, but the present invention is not limited thereto. The comparators 161(0) to 161(15) compare a priority of a channel with the preset priority. That is, priority information in the priority setting register 122 is read and stored in a corresponding one of the comparators 161(0) to 161(15). For example, if the channel is given a priority 9, information about the priority 9 is output from the priority setting register 122, and the comparator 161(9) outputs a signal of "1". The comparators other than comparator 161(9) output a signal of "0". Next, the AND circuits 162(0) to 162(15) are logic circuits for determining which priority level corresponds to an interrupt request masked with the PMR 121, that is, an interrupt request based on the signal C. The AND circuits 162(0) to 162(15) receive information output from the comparators 161(0) to 161 (15) and the signal C output from the logic circuit 130 to determine the priority of the signal C.

Only one of the comparators 161(0) to 161(15) can output a signal of "1". Hence, if the signal C is "1", any one of the AND circuits 162(0) to 162(15) outputs a signal of "1". Information output from the AND circuits 162(0) to 162(15) is sent to as many OR circuits 163(0) to 163(15) as the number of priority levels. In the OR circuits 163(0) to 163(15), interrupt requests output from the other interrupt control module 137 (N) are collected on the priority level basis. Then, information about whether or not there is an interrupt request on the priority level basis is output to the PMRR 170. In the PMRR 170, a flag indicating whether or not there is an interrupt request is stored in a register corresponding to a priority level of the interrupt request. Hence, the processor 110 can check whether or not there is an interrupt request masked with the PMR 121 on the priority level basis by reading a resister value of the PMRR 170. Incidentally, if the number of priority levels is small, and it is necessary to provide both of the PMF 140 and the PMRR 170, the PMRR 170 can be provided in place of the PMF 140. Incidentally, the processing of an interrupt request of this example is directed to an interrupt request of priority equal to or higher than a priority of a interrupt request currently handled with the CPU 110 up to the output of the signal C as described in detail in the first embodiment. Thus, in the first modified example as well, whether or not there is a higher-priority interrupt request is determined on the priority level basis.

Further, as a second modified example of the first embodiment, it is possible to provide a register storing information about whether or not there are masked interrupt requests in accordance with the number of groups if plural interrupt requests are grouped and a mask is set on the group basis. This can be described with reference to FIG. 9 although its configuration is omitted here. That is, the numbers of comparators 161(0) to 161(15), AND circuits 162(0) to 162(15), OR circuits 163(0) to 163(15), and PMRRs 170 of FIG. 9 are set based on the number of groups. Further, a register for setting group information is provided in place of the priority setting register 122, and a register for setting mask information is provided in place of the PMR 121. With such configuration, information about whether or not there is a masked interrupt request on the group basis can be stored in the PMRR 170. As a result, the processor 110 can check whether or not there is a masked interrupt request on the group basis.

To describe the interrupt control circuit of the present invention from the other viewpoint with reference to FIG. 2, this circuit can be defined as an interrupt control circuit including: the priority setting register 122 storing preset priority levels of plural interrupt requests; a priority mask register storing information designating whether or not to mask interrupt requests at priority levels, that is, the PMR 121; a masking unit for determining whether or not to mask plural interrupt requests based on the information about the priority setting register 122 and the priority mask register 121 and masking the request in accordance with the determination result, that is, the interrupt control module unit 150; and a priority mask flag indicating whether or not there is a masked the interrupt request based on the determination result from the masking unit, that is, the PMF 140. This configuration facilitates determination as to whether or not there is a masked interrupt request.

Incidentally, it is possible to determine whether or not there is a masked interrupt request with respect to each priority level of the interrupt request by using the interrupt control module unit 151 of the interrupt control circuit of the first modified example. Likewise, in the second modified example, it is possible to determine whether or not there is a masked interrupt request with respect to each interrupt request group as described above. However, this is one modified example, and similar functions can be executed with the other units.

As described above, a register visible from the processor can be set by providing the PMF 140 indicating whether or not there is an interrupt request masked with the PMR 121. Hence, the processor can easily determine whether or not there is an interrupt request. Further, processing corresponding to the priority can be carried out.

Second Embodiment

Referring next to the accompanying drawings, a second embodiment of the present invention is described. Similar to the first embodiment, the second embodiment is accomplished as a single-chip circuit obtained by packaging an interrupt control circuit of the present invention into a semiconductor element such as an LSI. A feature of the second embodiment resides in an embedded system controlled by plural processors.

Figure 10:
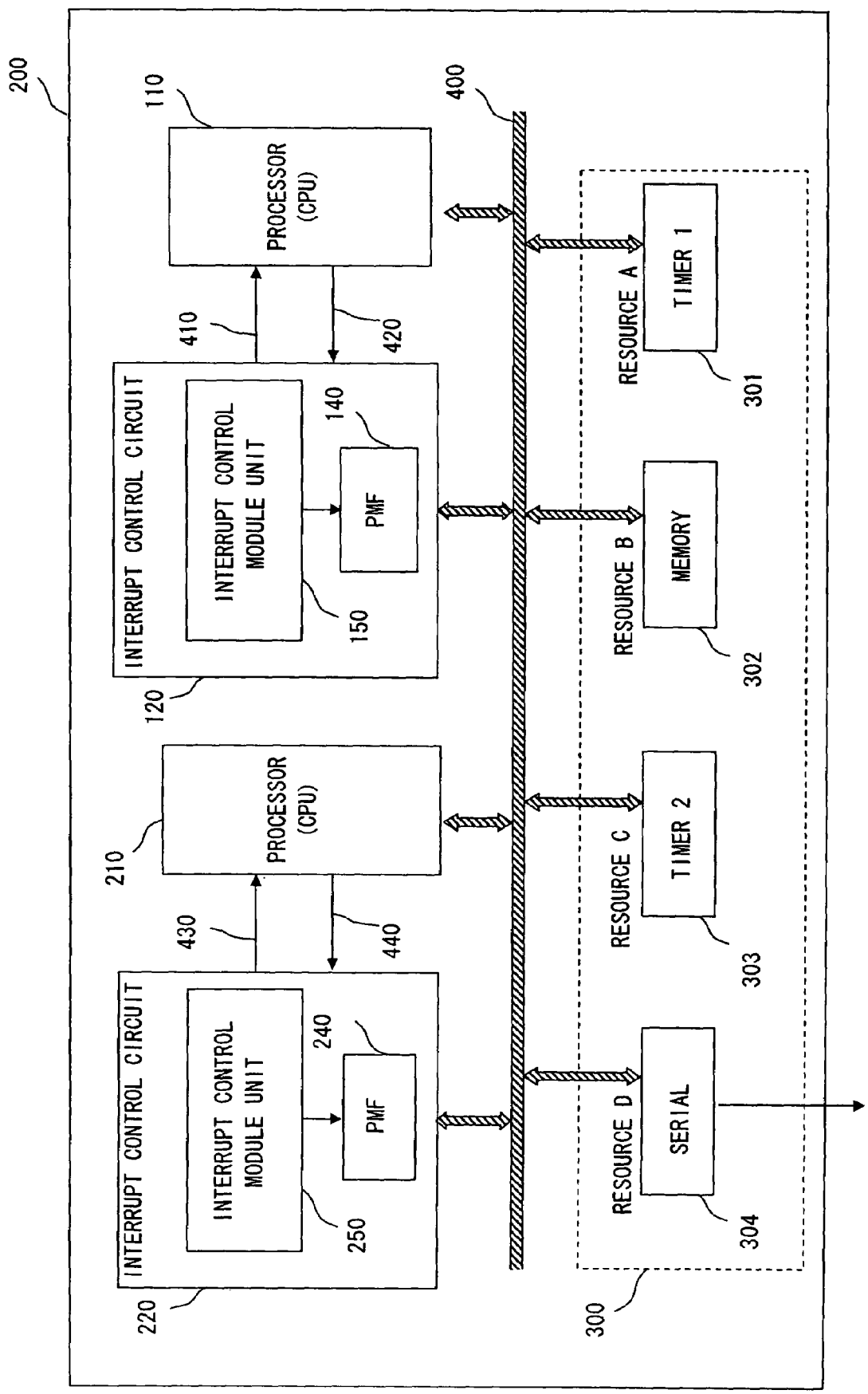
FIG. 10 is a block diagram of the configuration of a semiconductor device according to a second embodiment of the present invention.

Referring to the drawings, the second embodiment is described below. FIG. 10 is a diagram of a semiconductor device including an interrupt control circuit of the second embodiment. Description about the same components and operational principle of the semiconductor device as those of the first embodiment is omitted here.

As shown in FIG. 10, a semiconductor device 200 includes two processors 110 and 210, the interrupt control circuit 120, 220, and the resource 300. The device further includes the system bus 400 for connecting these components and exchanging commands and data therebetween, and signal lines 410, 420, 430, and 440 for directly connecting between the interrupt control circuits 120 and 220 and the processors 110 and 210. Further, the device includes a power supply line and input/output terminal for operating these components. Incidentally, the power supply line and input/output terminal are not shown. In the second embodiment, the processor 110 includes the interrupt control circuit 120, and the processor 210 includes the interrupt control circuit 220. The resource 300 commonly uses the two processors 110 and 210.

Here, the semiconductor device 200 is used in an embedded system for controlling, for example, an electronic control unit similar to the first embodiment. The processors 110 and 210 execute system control for the electronic control unit, and interrupt handling such as data processing based on sensor information, system self-diagnosis, and data backup. The interrupt control circuits 120 and 220 control an interrupt request sent to the processors 110 and 210. The resources 300 are functions necessary for interrupt handling, for example, a timer, a memory, or a serial communication mechanism.

Each resource is connected to the system bus 400 as needed, and transmits/receives data or commands via the system bus 400 to/from the processors 110 and 210, the interrupt control circuits 120 and 220, or the other resources 300 similar to the first embodiment. Further, each resource is provided with an input/output terminal if necessary. Needless to say, data or the like can be transmitted/received between predetermined circuits not through the system bus 400 as needed. The circuits are not shown for ease of illustration.

For example, the resource 300 includes the resource A301, the resource B302, the resource C303, and the resource D304 similar to the first embodiment. Needless to say, the function or number of resources can be, of course, changed in accordance with applications of the semiconductor device 200. The two processors handle plural interrupt requests in parallel. The number of processors may be two or more. Incidentally, the above semiconductor device 200 is also called "microcontroller" and broadly interpreted as "microcomputer".

The interrupt control circuits 120 and 220 include the interrupt control module units 150 and 250 as a detecting unit for determining whether or not any masked interrupt request remains during interrupt handling, and the priority mask flags 140 and 240 which indicate whether or not there is an interrupt request similar to the first embodiment. The detailed configuration and operation thereof are the same as those of the first embodiment. In the second embodiment, in addition to beneficial effects of the first embodiment, the following effects can be obtained. In the following description, the effects of the second embodiment and problems of a conventional multiprocessor system are described below.

In a multiprocessor system including plural processors such as a dual-processor, accesses to a memory or peripheral device shared between the plural processors (hereinafter referred to as "resource") are compared between the processor in some cases. Unless a resource necessary for interrupt handling can be exclusively used until the completion of processing, correct processing results cannot be obtained. To that end, an OS implemented on, for example, the processor controls the use state of the resource, and an access to the resource is allowed by the OS.

Figure 11:
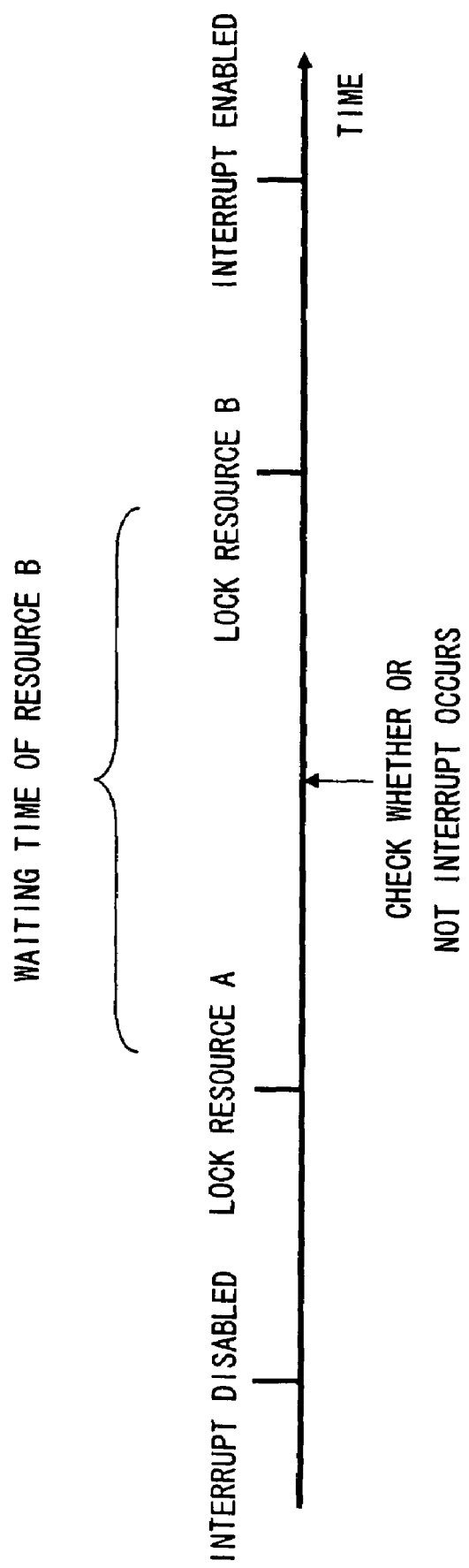
FIG. 11 shows an interrupt handling example of the second embodiment based on the time axis.

FIG. 11 shows an operation of handling an interrupt request by use of a resource shared among plural processors based on the time axis. FIG. 11 shows a procedure up to the permission of handling of an interrupt request by use of the resource A and the resource B. If interrupt request handling is started, the resource A is locked after permission to use the resource A is obtained. Here, such condition that the permission to use the resource is omitted by the OS means that the resource is locked. After that, the resource B is locked after the permission to use the resource B is obtained. For example, if the resource B is used for handling another interrupt request, the resource B cannot be accessed until the completion of handling. This is because a mechanism of managing the use state of the resource and controlling accesses to the resource is used. The mechanism can employ a PMR.

To control accesses to the resource, it is necessary to limit accesses to interrupt requests sorted to the OS level and the application level. That is, when the resource is being used, the request is masked with the PMR not to handle another interrupt request. More specifically, during handling of a previous interrupt request, an appropriate value is set in the PMR to mask another subsequent interrupt request that uses the same resource. As shown in FIG. 4, the interrupt requests sorted to the OS level and the application level are priorities 4 to 15. Hence, the PMR is set to mask all interrupt requests of the interrupt priorities 4 to 15. That is, "H" is written to the $4^{th}$ to $15^{th}$ bits of the PMR, and "L" is written to the other bits (That is, 0th to $3^{rd}$ bits).

However, in the case of masking all interrupt requests of the interrupt priorities 4 to 15, an interrupt request of higher priority than that of an interrupt request that waits for the permission to access the resource B is masked in some cases. Thus, it is necessary to check whether or not there is another interrupt request to handle while the permission to access the resource is waited for.

Figure 12:
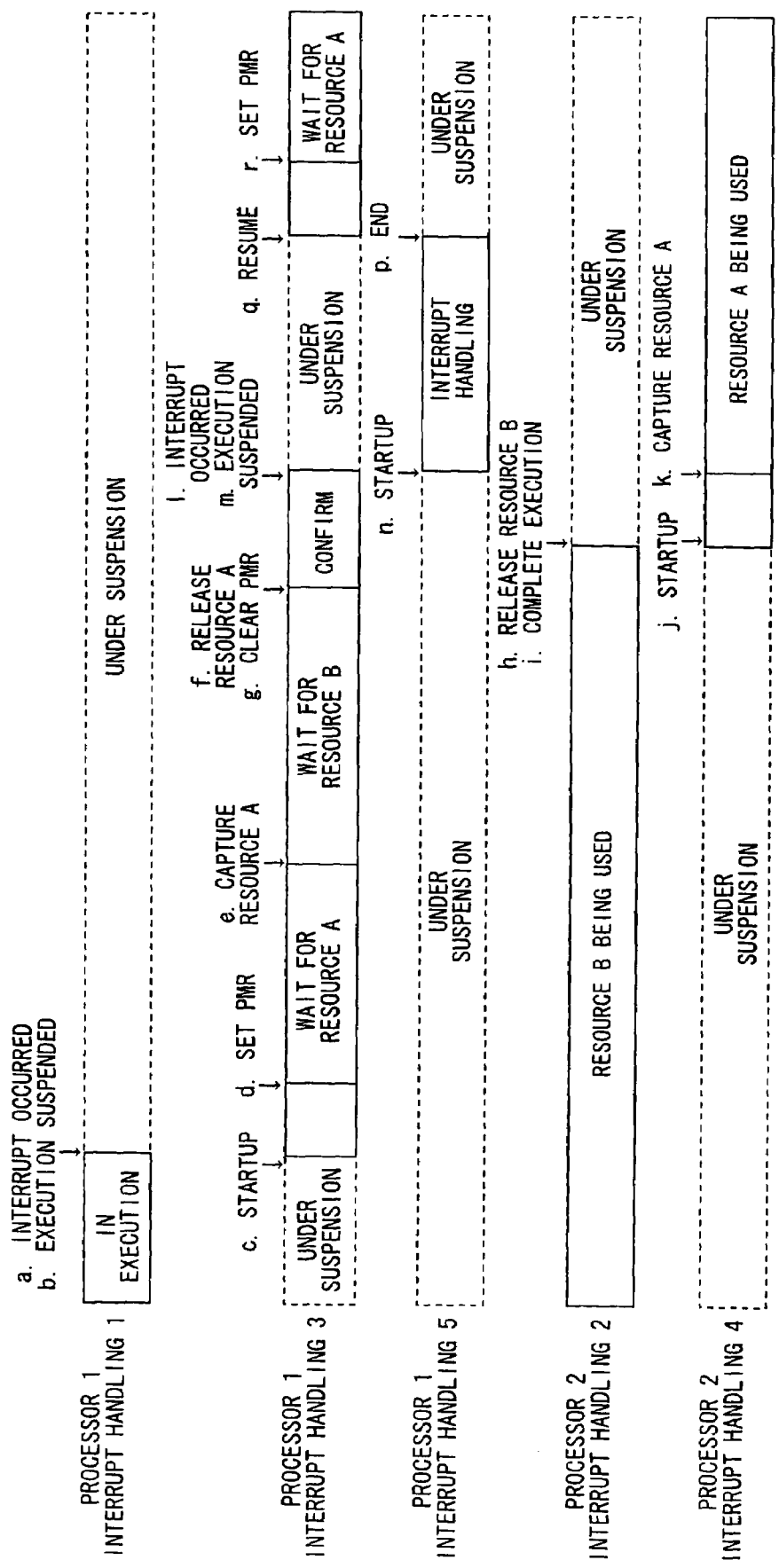
FIG. 12 is a timing chart of interrupt handling of the related art.
Figure 13:
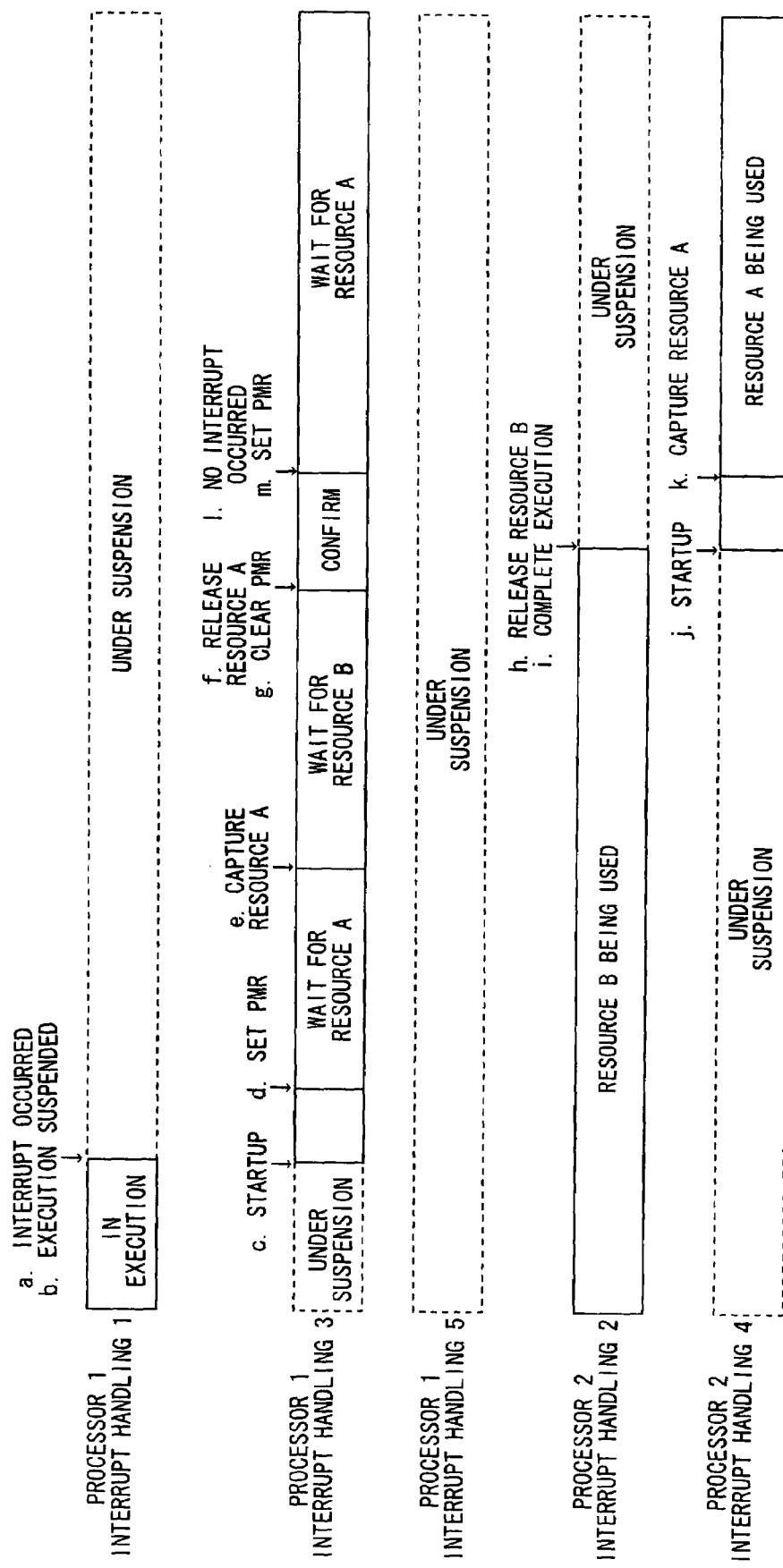
FIG. 13 is a timing chart of another example of the interrupt handling of the related art.

To check whether or not there is another masked interrupt request while the permission to access the resource is waited for, there is a conventional method of checking registers storing interrupt requests one by one as described above. Alternatively, an interrupt masked with the PMR is accepted. If there is another interrupt request, the request may be accepted and handled. This conventional method is descried with reference to simple timing charts of FIGS. 12 and 13. In FIGS. 12 and 13, multiprocessor environments where plural interrupt requests are handled in parallel is described by way of example. In this example, it is assumed that 5 interrupt requests are handled with the processors 1 and 2. Here, the time axes for handling of 5 interrupt requests in FIGS. 12 and 13 are the same. Here, a method of sharing the resource between the processors is additionally set. A period necessary for the method or a period for switching interrupt requests to handle is not shown in FIGS. 12 and 13. In FIGS. 12 and 13, the processor 1 executes interrupt handling 1, and the processor 2 executes handling of the interrupt request 2 by use of the resource B.

Referring to FIG. 12, description is made of a processing operation in the case where another interrupt request to handle is detected while the permission to access the resource is waited for. If the interrupt request 3 of higher priority than that of the handled interrupt request 1 occurs, an interrupt request occurs (a) and handling of the interrupt request 1 is suspended (b). Then, the handling of the interrupt request 3 is started (c). The handling of the interrupt request 3 uses the resources A and B, so the PMR is set (d) to mask the other interrupt requests. After that, the handling of the interrupt request 3 is permitted to access the resource A (e), but the resource B is being used for handling of the interrupt request 2, so the handling of the interrupt request 3 should wait for permission to access the resource B for some time. At this time, if it is determined whether or not another interrupt request masked with the PMR exists, the used resource A is released (f) to cancel masking with the PMR (g). The reason the resource A is released is that if handling of an interrupt request using the resource is interrupted by another interrupt request handling before the resource is released, and the two requests scramble for the resource, the processing of the processor is deadlocked.

On the other hand, while the processor 1 checks whether or not there is another interrupt request, handling of the interrupt request 2 with the processor 2 releases the resource B (h), and interrupt handling is completed (i). The processor 2 starts execution of handling of the interrupt request 4 (j). If the handling of the interrupt request 4 uses the resource A, the released resource A is used (k). In FIG. 12, since handling of the interrupt request 5 occurs, it is determined whether or not there is an interrupt request (l), and execution of the handling of the interrupt request 3 is suspended (m). Then, handling of the interrupt request 5 is started (n) to handle the interrupt request. After the completion of handling of the interrupt request 5 (p), handling of the interrupt request 3 is restarted (q). However, the resource A is used for handling of the interrupt request 4, so the PMR is set again (R) to wait for the permission to access the resource A.

On the other hand, FIG. 13 illustrates a processing operation in the case where another interrupt request is not detected while the permission to use the resource is waited for. The procedure up to (k) is the same as that of FIG. 12, so its description is omitted. In FIG. 13, since handling of the interrupt request 5 is not detected, it is determined that there is no interrupt request (l), and the PMR is set again (m) to restart handling of interrupt request 3. However, upon handling of the interrupt request 4, the resource A is used, so the procedure is restarted from the step of waiting for permission to use of the resource A for handling of the interrupt request 3.

In the example of FIGS. 12 and 13, handling of the interrupt request 3 temporarily gives up the permitted access to the resource A although it is uncertain whether or not there is an interrupt request. In the multiprocessor system, there is a possibility that interrupt handling executed with another processor accesses the resource A during such period. It is unavoidable if there is a masked interrupt request; otherwise, the handling of the interrupt request 3 should wait for the permission to access the resource A again, resulting in a problem of lowering processing efficiency.

Figure 14:
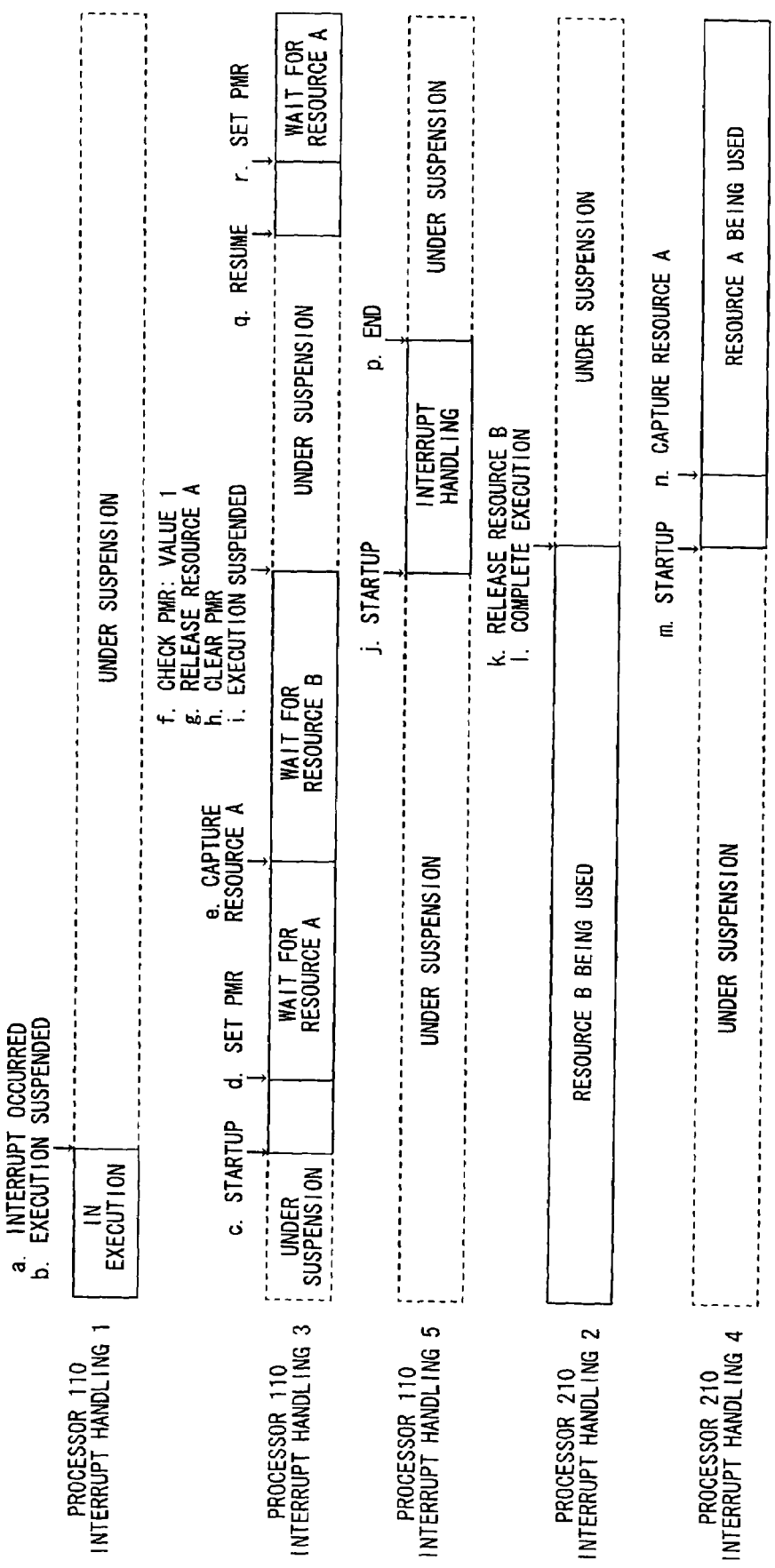
FIG. 14 is a timing chart of interrupt handling of the second embodiment.

To overcome this problem, operations of the interrupt control circuit of the second embodiment of the present invention are described with reference to FIGS. 14 and 15. FIG. 14 shows a processing operation in the case where another interrupt request is detected while the permission to access the resource is waited for. The procedure up to (e) is the same as that of FIG. 12, so its description thereof is omitted. After that, if another interrupt request is checked after the elapse of predetermined wait time for the permission to use the resource B, a PMF value is checked (f). In FIG. 14, there is another interrupt handling, so the PMF value is "1", which means that an interrupt request of higher priority than that of the interrupt request 3 is input and masked with the PMR. Hence, handling of the interrupt request 3 releases the resource A (g) to cancel masking with the PMR (h). Then, the handling of the interrupt request 5 is started (j) to start interrupt handling. On the other hand, handling of the interrupt request 2 releases the resource B (k) to complete the interrupt handling (l). Then, handling of the interrupt request 4 is started (m). If the handling of the interrupt request 4 uses the resource A, the released resource A is accessed (n). The handling of the interrupt request 5 is completed (p), and the restarted handling of the interrupt request 3 sets the PMR (q) to mask another interrupt request again and wait for the permission to access the resource A.

Figure 15:
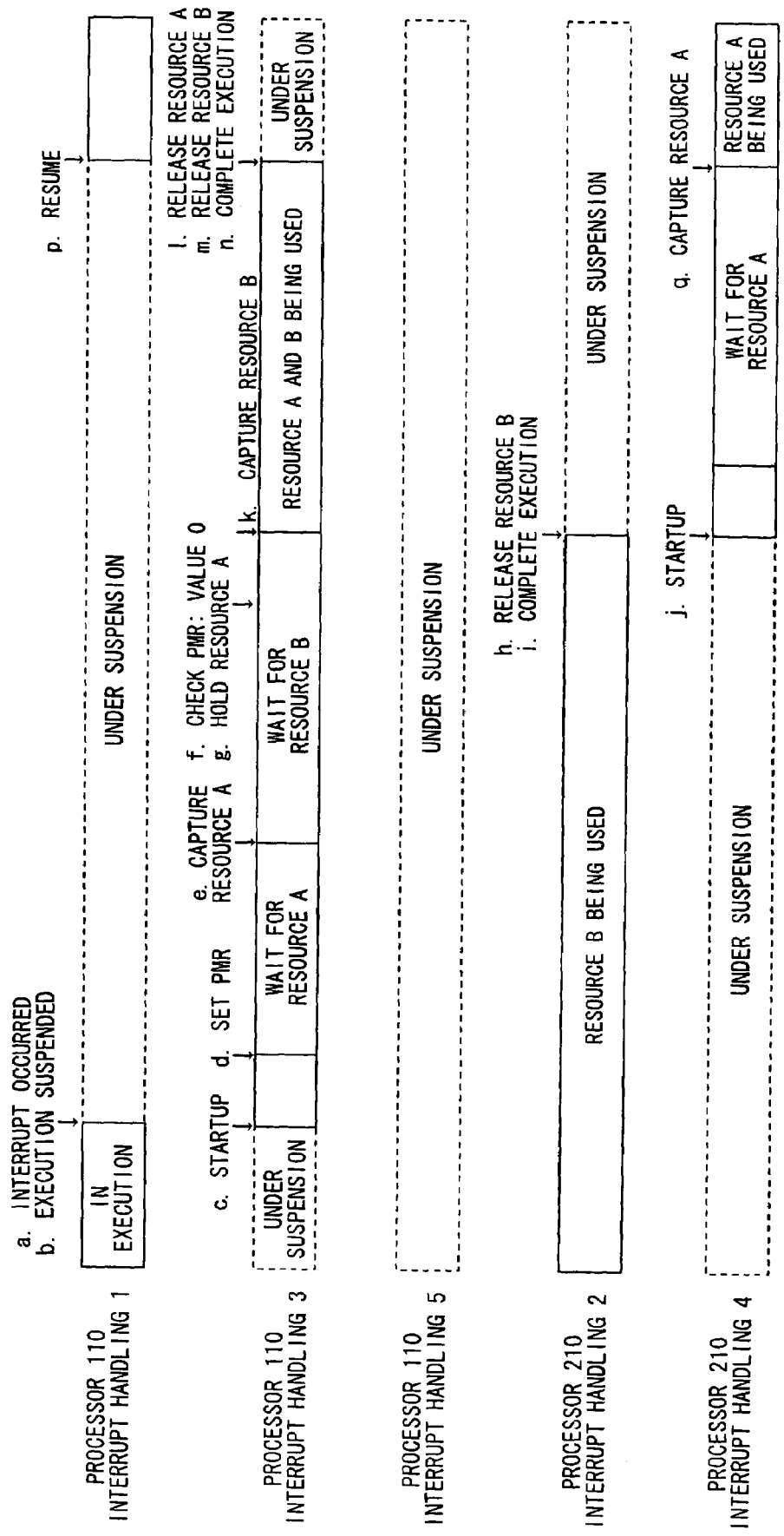
FIG. 15 is a timing chart of another example of the interrupt handling of the second embodiment.

FIG. 15 shows a processing operation in the case where another interrupt request is not detected while the permission to access the resource is waited for. The procedure up to (e) is the same as that of FIG. 14, so its description is omitted. In FIG. 15, an interrupt request of higher priority than that of the interrupt request 3 is not masked with the PMR, so the PMF value is "0" (f). Thus, the handling of the interrupt request 3 keeps the resource A as in (g). After that, the handling of the interrupt request 2 releases the resource B (h) and the interrupt handling is completed (i). Then, the handling of the interrupt request 3 is permitted to access the resource B (k). Therefore, the handling of the interrupt request 3 can use the resource B, so the interrupt handling is executed. The handling of the interrupt request 4 is started (j), but the handling of the interrupt request 3 uses the resource A, so the handling of the interrupt request 4 waits for the handling of the interrupt request 3 to release the resource A. The handling of the interrupt request 3 releases the resource A (l), releases the resource B (m), and completes the execution of the interrupt handling (n). Hence, the interrupt handling 1 is restarted (p) and the handling of the interrupt request 4 is permitted to use the resource A (q).

As described above, as compared with the example of FIG. 15 with the example of FIG. 13, the handling of the interrupt request 3 keeps the resource A while checking whether or not there is an interrupt request masked with the PMR. Thus, there is no fear that the released resource A is used for the other interrupt handling during the checking. Thus, the handling of the interrupt request 3 can be promptly resumed after the checking. Hence, the interrupt handling can be efficiently executed.

As described above, providing the PMF eliminates a need to cause the executed interrupt handling to release the used resource for checking an interrupt request although it is uncertain whether or not the request is detected. Thus, there is no fear that the resource for the executed interrupt handling is used by the other interrupt handling. As a result, a period for waiting for the resource to be recaptured after the resource is robbed by the other handling is reduced, leading to high task processing efficiency. Therefore, in addition to the effects of the first embodiment, the interrupt handling can be more efficiently executed.

Further, it is unnecessary to check each register storing the interrupt request, so a period for checking the register can be reduced similar to the first embodiment.

Further, in the case of grouping interrupt requests, the processor reads the PMF to check whether or not there is a masked interrupt request on the group basis as in the first embodiment.

Further, a register visible from the processor can be set by providing the PMF indicating whether or not there is an interrupt request masked with the PMR. Hence, the processor can easily determine whether or not there is an interrupt request as in the first embodiment.

Third Embodiment

Figure 16:
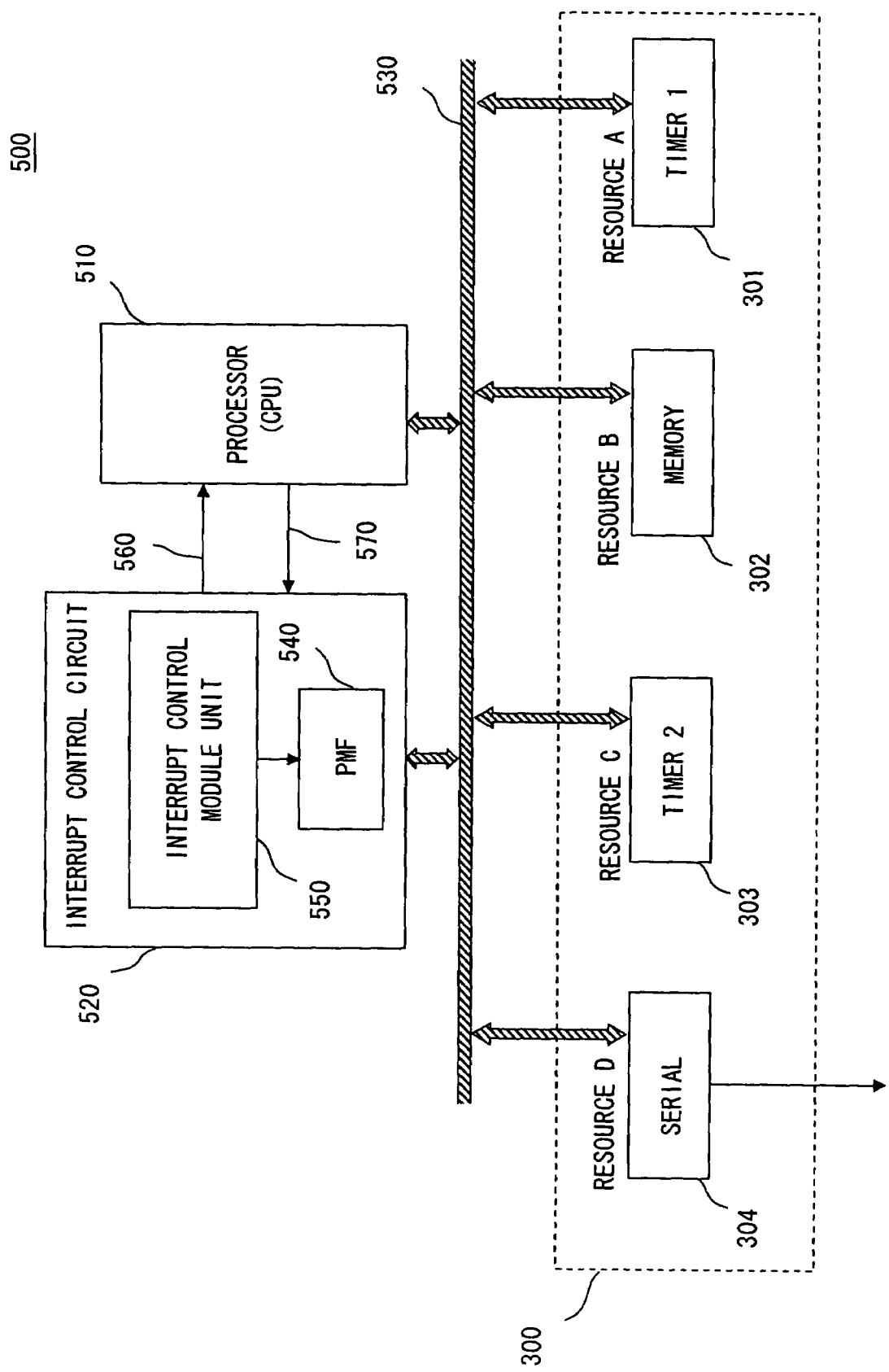
FIG. 16 is a block diagram of the configuration of a semiconductor device according to a third embodiment of the present invention.

Referring next to the drawings, a third embodiment of the present invention is described. The third embodiment is accomplished as a single-chip circuit obtained by packaging an interrupt control circuit of the present invention into a semiconductor element different from an element for the processor. FIG. 16 is a diagram of a processor control system including an interrupt control circuit of the third embodiment.

As shown in FIG. 16, a semiconductor device 500 includes a processor 510, an interrupt control circuit 520, and the resource 300. The device further includes a system bus 530 for connecting these components and exchanging commands and data therebetween, and signal lines 560 and 570 for directly connecting between the interrupt control circuits 520 and the processor 510. Further, the device includes a power supply line and input/output terminal for operating these components as in the first embodiment. A feature of the third embodiment is that the processor 510 and the interrupt control circuit 520 are provided in different semiconductor elements. The components and operational principle of the interrupt control circuit 520 are the same as those of the first embodiment, so its description is omitted here.

Incidentally, the interrupt control circuit 520 of the third embodiment can be also controlled by plural processors as in the second embodiment. Further, the resource 300 can be packaged into the same chip as that of the interrupt control circuit 520 or the processor 510. Alternatively, the resource 300 is packaged into a chip different from the chip of the interrupt control circuit 520 and the processor 510.

Each resource is connected to the system bus 530 as needed, and transmits/receives data or commands via the system bus 530 to/from the processor 510, the interrupt control circuit 520, or the other resources as in the first embodiment. Further, each resource is provided with an input/output terminal if necessary. Needless to say, data or the like can be transmitted/received between predetermined circuits not through the system bus 530 as needed. The circuits are not shown for ease of illustration.

With the above configuration, even in the processor control system 500 where the processor 510 and the interrupt control circuit 520 are packaged into different semiconductor elements, similar effects to the first and second embodiments can be attained.

Incidentally, as another embodiment of the present invention, the present invention is applicable not to the semiconductor devices 100 and 200, and the processor control system 500 but to every device using the embedded system such as a processor control system including an interrupt control circuit.

It is apparent that the present invention is not limited to the above embodiment that may be modified and changed without departing from the scope and spirit of the invention.

What is claimed is:

1. An interrupt control circuit, comprising:
   a priority mask register holding priority mask information being set with respect to each priority level of interrupt requests;
   a first masking unit comparing a priority level of an interrupt request with a priority level of an interrupt handling executed by a processor, and outputting an interrupt request signal upon the interrupt request having a higher priority level than, or an equal priority level to, the priority level of the interrupt handling executed by the processor;
   a second masking unit determining whether to mask the interrupt request signal outputted from the first masking unit in response to the priority mask information;
   a detecting unit determining whether or not there is the masked interrupt request signal in response to a result of the second masking unit; and
   a priority mask flag indicating whether or not there is the masked interrupt request signal having a higher priority level than, or an equal priority level to, the priority level of the interrupt handling executed by the processor.

2. The interrupt control circuit according to claim 1, wherein the priority mask flag is readable by the processor.

3. The interrupt control circuit according to claim 2, wherein the detecting unit determines whether or not there is a masked interrupt request with respect to each priority level of the interrupt request.

4. The interrupt control circuit according to claim 2, wherein the detecting unit determines whether or not there is a masked interrupt request with respect to each interrupt priority group preset for the interrupt request.

5. The interrupt control circuit according to claim 1, wherein the detecting unit determines whether or not there is a masked interrupt request with respect to each priority level of the interrupt request.

6. The interrupt control circuit according to claim 1, wherein the detecting unit determines whether or not there is a masked interrupt request with respect to each interrupt priority group preset for the interrupt request.

7. A semiconductor device, comprising:
   an interrupt control circuit according to claim 1; and
   a processor determining whether or not to release a resource used for interrupt handling based on whether or not there is an interrupt request.

8. The interrupt control circuit according to claim 1, further comprising:
   a priority setting register holding a priority of each of a plurality of interrupt requests,
   wherein the first masking unit compares the priority level of the interrupt request with the priority level of the interrupt handling executed by the processor in response to the priority setting register.

9. The interrupt control circuit according to claim 8, wherein the interrupt requests are masked on the group basis, and
   whether or not there is an interrupt request masked on the group basis is determined.

10. The interrupt control circuit according to claim 1, further comprising a mask register having mask information for each interrupt request,
    wherein the first masking unit determines whether to mask the interrupt request in response to the mask register and compares a priority level of the unmasked interrupt request with a priority level of the interrupt handling executed by the processor.

11. An interrupt control method that controls a plurality of interrupt requests for interrupt handling executed by a processor, comprising:
    executing the interrupt handling;
    comparing a priority level of an interrupt request with a priority level of interrupt handling executed by a processor, and outputting an interrupt request signal upon the interrupt request having a higher priority level than, or an equal priority level to, the priority level of the interrupt handling executed by the processor;
    determining whether to mask the interrupt request signal in response to priority mask information
    determining whether or not there is the masked interrupt request in response to a result of the determining whether to mask; and
    storing a priority mask flag indicating whether or not there is the masked interrupt request signal having a higher priority level than, or an equal priority level to the priority level of the interrupt handling executed by the processor.

12. The interrupt control method according to claim 11, wherein whether or not there is the interrupt request can be readable by the processor.

13. The interrupt control method according to claim 12, wherein whether or not there is a masked interrupt request is determined with respect to each priority level of the interrupt request.

14. The interrupt control method according to claim 12, wherein whether or not there is a masked interrupt request is determined with respect to each interrupt priority group preset for the interrupt request.

15. The interrupt control method according to claim 11, wherein whether or not there is a masked interrupt request is determined with respect to each priority level of the interrupt request.

16. The interrupt control method according to claim 11, wherein whether or not there is a masked interrupt request is determined with respect to each interrupt priority group preset for the interrupt request.

17. A semiconductor device, comprising:
an interrupt control circuit, comprising:
a priority mask register holding mask information being set with respect to each priority level of interrupt requests;
a first masking unit comparing a priority level of an interrupt request with a priori level of an interrupt handling executed by a processor;
a second masking unit determining whether to mask the interrupt request in response to the mask information upon the interrupt request having a higher priority level than, or an equal priority level to the priority level of the interrupt handling executed by the processor;
a detecting unit determining whether or not there is the masked interrupt request in response to a request of the second masking unit; and
a priority mask flag indicating whether or not there is the masked interrupt request; and
a processor determining whether or not to release a resource used for interrupt handling based on whether or not there is an interrupt request,
wherein the processor checks the priority mask flag after an elapse of predetermined wait time for a permission to use another resource for the interrupt handling, and releases the resource when the priority mask flag indicates a presence of the masked interrupt request.

* * * * *